(12) United States Patent
Gutowski et al.

(10) Patent No.: US 6,640,106 B2
(45) Date of Patent: Oct. 28, 2003

(54) METHOD AND SYSTEM FOR VERIFYING THE POSITION OF A MOBILE STATION USING CHECKPOINTS

(75) Inventors: Gerald Gutowski, Palatine, IL (US); Stanley J. Benes, Round Lake Beach, IL (US)

(73) Assignee: Motorola, Inc., Schaumburg, IL (US)

( * ) Notice: Subject to any disclaimer, the term of this patent is extended or adjusted under 35 U.S.C. 154(b) by 195 days.

(21) Appl. No.: 09/957,417

(22) Filed: Sep. 20, 2001

(65) Prior Publication Data

US 2003/0054834 A1 Mar. 20, 2003

(51) Int. Cl.[7] .................................................. H04Q 7/20
(52) U.S. Cl. ................. 455/456.1; 455/423; 455/67.11; 701/214; 342/357.17
(58) Field of Search .......................... 455/456.1–456.5, 455/404.2, 423, 67.11, 67.16, 440, 421, 457; 701/214, 216, 213; 342/357.17, 357.09, 357.01–357.04, 450, 459

(56) References Cited

U.S. PATENT DOCUMENTS

| | | | | | |
|---|---|---|---|---|---|
| 5,724,660 A | * | 3/1998 | Kauser et al. | ............... | 455/456 |
| 5,790,073 A | * | 8/1998 | Tayloe et al. | ............... | 342/357 |
| 5,955,973 A | * | 9/1999 | Anderson | ................... | 340/988 |
| 6,138,026 A | * | 10/2000 | Irvin | ........................... | 455/456 |
| 6,414,635 B1 | * | 7/2002 | Stewart et al. | ............... | 342/457 |

* cited by examiner

Primary Examiner—Duc Nguyen
(74) Attorney, Agent, or Firm—Hisashi D. Watanabe

(57) ABSTRACT

The present invention provides a method and wireless communication system (100) for verifying a position of a mobile station (102). The system (100) determines whether the mobile station (102) is located within a checkpoint area (130). If so, the system (100) then compares a mobile station position of the mobile station (102) within the checkpoint area (130) and a checkpoint position (128) corresponding to the checkpoint area (130) to generate a result. The system (100) thereafter determines whether the result exceeds a predetermined error tolerance. The system (100) indicates an error associated with the position of the mobile station (102) if the result exceeds the predetermined error tolerance.

22 Claims, 5 Drawing Sheets

METHOD AND SYSTEM FOR VERIFYING THE POSITION OF A MOBILE STATION USING CHECKPOINTS

FIELD OF THE INVENTION

The present invention relates generally to wireless communication systems, and more particularly, to a method and an apparatus for verifying the position of a mobile station.

BACKGROUND OF THE INVENTION

A wireless communication system is a complex network of systems and elements that includes many mobile stations (such as radiotelephones, pagers, and the like) communicating with a wireless infrastructure. A typical wireless infrastructure includes several base transceiver stations, base station controllers and a call controller or switch. The base transceiver stations provide a radio link to each mobile station. The base station controllers control communication as well as manage operation and interaction of the base transceiver stations. The call controller or switch routes calls within the wireless communication system and links the system to a landline or public switch telephone network ("PSTN"). A wireless communication system may also include a position estimation system to determine the location of a particular mobile station. Examples of such position estimation systems include a celestial system, such as a global positioning system ("GPS"), and a terrestrial system, such as forward link trilateration ("FLT").

A mobile station may determine its position using a position estimation system and, then, provide position information corresponding to its position to the wireless infrastructure. The wireless infrastructure may use the position information for providing communication service, such as mobile commerce, and for billing purposes, such as location-based billing. The wireless infrastructure may query the mobile station or the mobile station may autonomously report its position.

Damage to the mobile station, wireless infrastructure or other network equipment may cause the mobile station to report an erroneous position to the wireless infrastructure. Also, the mobile station may report an erroneous position due to its environment, e.g., erroneous signals caused by obstructions and buildings in its vicinity. Thus, the mobile station may report an erroneous position to the wireless infrastructure and, as a result, calls to and from the mobile station may be billed incorrectly or provide faulty location services.

In addition to system damage, a wireless communication system may have inaccurate information about the location of one or more of its mobile stations for other reasons. Location fraud may cause the mobile station to report an erroneous position to the wireless infrastructure. A fraudulent user may modify the mobile station to always report a position within its home coverage area even when the mobile station is outside of its home coverage area. The fraudulent user may do so to avoid a higher rate that is charged for usage outside of his or her home coverage area. Location information reported by a mobile station may also be inaccurate due to network to mobile station latency or stale reported positions.

It is desirable to have a wireless communication system that knows the position of its mobile stations with reasonable accuracy. It is particularly important for the wireless infrastructure to have accurate information about the position of the mobile stations so that the wireless infrastructure can provide communication services properly and bill for those services correctly. Otherwise, calls may provide faulty location services or may be billed incorrectly because the wireless infrastructure has incorrect information regarding the position of the mobile stations. Therefore, a need exists for an improved method and apparatus for verifying the position of a mobile station in a wireless communication system.

SUMMARY OF THE INVENTION

The present invention is directed to a method for verifying a position of a mobile station in a wireless communication system. The system monitors the position of the mobile station to determine whether the mobile station is located within a checkpoint area. If the mobile station is located within a checkpoint area, then the system generates a result by comparing a mobile station position to a checkpoint position. The mobile station position is a particular position of the mobile station when it is within the checkpoint area, and the checkpoint position is a position that corresponding to the checkpoint area. The system then determines whether the generated result exceeds a predetermined error tolerance. If the result exceeds the predetermined error tolerance, then the system indicates an error associated with the position of the mobile station.

The present invention is also directed to a method for verifying a position of a mobile station in a wireless communication system based on at least two mobile station positions, preferably derived from different location techniques. The system monitors the position of the mobile station to determine whether the mobile station is located within a checkpoint area. If the mobile station is located within a checkpoint area, then the system generates a first result by comparing a first mobile station position to a checkpoint position and a second result by comparing a second mobile station position to the checkpoint position. Each mobile station position is a particular position of the mobile station when it is within the checkpoint area, and the checkpoint position is a position that corresponding to the checkpoint area. The system then determines whether either (or both) of the first and second results exceeds a predetermined error tolerance. If at least one of the results exceeds the predetermined error tolerance, then the system indicates an error associated with the position of the mobile station.

The present invention is further directed to a wireless communication system for verifying a position of a mobile station. The system comprises a memory portion, a position circuit, and a processor coupled to the memory portion and the position circuit. The memory portion stores a checkpoint position corresponding to a checkpoint area. In response to a detection that the mobile station is within the checkpoint area, the position circuit generates a mobile station position of the mobile station. The processor compares the mobile station position to the checkpoint position to generate a result. If the result exceeds a predetermined error tolerance, then the processor indicates an error associated with the position of the mobile station.

The present invention is still further directed to a wireless communication system for verifying a position of a mobile station. The system comprises a memory portion, a position circuit, and a processor coupled to the memory portion and the position circuit. The memory portion stores checkpoint parameters corresponding to a checkpoint area, and the position circuit generates a mobile station position of the mobile station. The processor determines whether the mobile station is within the checkpoint area based on the mobile station position. The processor also determines whether the mobile station position is accurate based on the checkpoint parameters and one or more error checking routines.

DETAILED DESCRIPTION OF THE PREFERRED EMBODIMENTS

The present invention provides a method and a wireless communication system for verifying a position of a mobile station. Verification is based on comparing a mobile station position of the mobile station to a checkpoint position of a checkpoint area. The checkpoint position is an accurate and reliable indicator for a particular checkpoint area. Thus, the accuracy of a mobile station position may be verified by comparing its position to a checkpoint position. In the alternative, verification may also be based on comparing a first mobile station position to a second mobile station position, thus avoiding the need for a checkpoint position and a checkpoint area.

Either a service provider or a mobile station user may establish the checkpoint position and checkpoint area. In regard to the former, a service provider may define a plurality of positions as checkpoints. Such checkpoint positions predetermined by the service provides include, but are not limited to, a street corner, a city block, a building, and a common landmark. In regard to the latter, a mobile station user may calibrate the mobile station so that a checkpoint position corresponds to a user-designated position. Such checkpoint positions determined by the user include, but are not limited to, the user's home, the user's office, and other locations frequently visited by the user.

Figure 1:
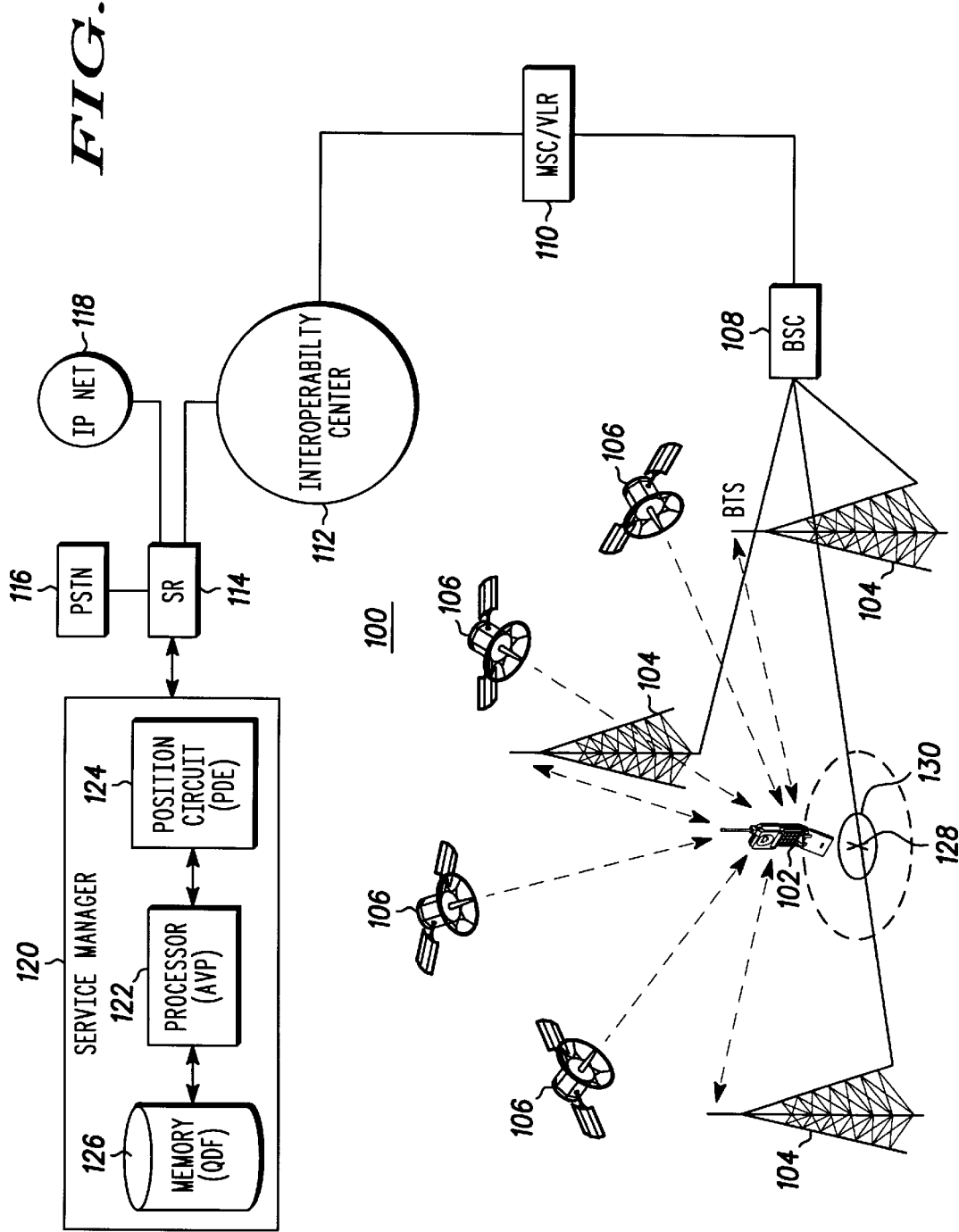
FIG. 1 is a block diagram representing a wireless communication system that may be adapted to operate in accordance with the preferred embodiments of the present invention.

Referring to FIG. 1, there is provided a first preferred embodiment of a wireless communication system 100 of the present invention. The system 100 includes a mobile station 102, base transceiver stations ("BTS's") 104, and one or more position estimation systems. The BTS's provide a wireless voice and/or data link between the mobile station 102 and various other wired and wireless communication devices.

The wireless communication system 100 may use any type of position estimation system, such as a terrestrial positioning system and a celestial positioning system, to determine the mobile station position. As shown in FIG. 1, the mobile station 102 receives position information from a celestial positioning system, namely global positioning system ("GPS") satellites 106. The mobile station also determines position information from communication with a terrestrial positioning system, namely BTS's 104. The terrestrial positioning system may utilize a variety of techniques including, but not limited to, a forward link trilateration ("FLT") technique, an advanced forward link trilateration ("AFLT") technique, an amplitude difference angle of arrival ("AD-AOA") technique, and an enhanced observed time difference ("EOTD") technique. The mobile station 102 may also receive the mobile station position from another entity via a wireless communication link, such as the Bluetooth wireless technology. Examples of such external information include location information referenced and time-stamped off of GPS and/or terrestrial non-FLT, such as an overlay terrestrial location system. Overlay terrestrial location systems are available from third parties such as TruePosition of King of Prussia, Pa. and U.S. Wireless of San Ramon, Calif. The mobile station 102 may autonomously report its position to a wireless infrastructure of the wireless communication system 100, or the wireless infrastructure may query the mobile station to report its position.

The BTS's 104 are part of a wireless infrastructure of the wireless communication system 100. In addition to the BTS's, the wireless infrastructure includes a base station controller ("BSC") 108, a mobile switching center/visitor location register ("MSC/VLR") 110, an interoperability center 112, and a selective router ("SR") 114. The BSC 108 controls communication between the BTS's 104, and manages the operation and interaction of the BTS's. The MSC/VLR 110 routes calls to and from the mobile station 102 as well as tracking location information of the mobile stations 102. The interoperability center 112 provides proper conversion of voice and/or data signals of the mobile station 102 to and from another communication protocol, if necessary. The selective router 114 routes voice and/or data calls within the wireless communication system as well as to and from landline voice systems, such as a public switch telephone network ("PSTN") 116, and landline data systems, such as an Internet Protocol Network ("IP NET") 118. Each of the above elements of the wireless infrastructure are commercially available from Motorola, Inc. of Schaumburg, Ill.

For the present invention, a service manager 120 must be included somewhere within the wireless communication system 100 for interoperability with the mobile station 102. For the preferred embodiment shown in FIG. 1, the service manager 120 is linked to the SR 114, thus providing a centralized location accessible to many different parts of the wireless infrastructure, including the SR's 114, interoperability centers 112, MSC/VLR's 110, BSC's 108 and BTS's 104. However, it is to be understood that the service manager 120 may be located elsewhere within the wireless communication system 100 within compromising its functionality since each part of the system has a communication link, direct or indirect, to all other parts of the system. For the same reason, the individual components of the service manager 120 may be separated and distributed throughout the system 100. For example, the second preferred embodiment (discussed below) provides the service manager 120 within the mobile station 102.

The service manager 120 includes a processor 122, a position circuit 124 coupled to the processor, and a memory portion 126 also coupled to the processor. The processor 122, the position circuit 124, and the memory portion 126 may be individual components or integrated together, in part or as a whole. For the first preferred embodiment shown in FIG. 1, the processor 122 is an Auto-Verification of Position ("AVP"), the position circuit 124 is position determining equipment ("PDE"), and the memory portion 126 is a quality definition file ("QDF"). The memory portion 126 stores a checkpoint position 128 and a checkpoint area 130 in which the checkpoint position corresponds to the checkpoint area. The position circuit 124 generates a mobile station position of the mobile station 102 in response to a detection that the mobile station is within the checkpoint area 130. The mobile station position is determined by the position circuit 124 of the mobile station 102 via a celestial positioning system or a terrestrial positioning system.

The processor 122 determines whether the mobile station 102 is within the checkpoint area 130, and compares parameters of the mobile station to parameters of the checkpoint area. The mobile station parameters are determined by the mobile station 102, and the checkpoint area parameters are stored in the memory 126. The memory 126 includes the checkpoint position 128 as well as information regarding the propagation and geographic environment of the checkpoint area 130. For the preferred embodiment, the processor 122 compares the mobile station position and the checkpoint position 128 to generate a result. If the processor 122 determines that the result exceeds a predetermined error tolerance, then the processor indicates an error associated with the position of the mobile station 102.

The memory portion 126 stores a checkpoint position 128 and related parameters, including propagation and geographic parameters, corresponding to a checkpoint area 130. The memory portion 126 may also store a program or a set of operating instructions for the processor 122. For the preferred embodiments, multiple checkpoint positions and checkpoint areas are stored in the memory portion 126, i.e., QDF. The checkpoint position 128 is a known position that is established by either a service provider or a mobile station user. Checkpoint positions 128 predetermined by the service provider include, but are not limited to, a street corner, a city block, a building, and a common landmark. Checkpoint positions 128 determined by the user include, but are not limited to, the user's home, the user's office, and other locations frequently visited by the user. A user of the mobile station 102 may calibrate the mobile station so that a checkpoint position 128 corresponds to a user-designated position. The checkpoint position 128 may be, but is not limited to, latitude and longitude coordinates (i.e., in units of degrees, minutes, seconds, and fractional seconds) corresponding to the checkpoint area 130. The latitude/longitude coordinates may also be in decimal units of degrees.

For example, a service provider may establish a user's home address as a checkpoint area 130 and determine a checkpoint position 128 associated with that checkpoint area. In this example, when a user subscribes to the service provider's services, the user may provide the service provider with his or her address information such as the user's home address, billing address, work address, and the like. Based on the user's address information, the service provider may determine a specific checkpoint position 128 to correlate with the user's home address (such as the center of the user's home) and a checkpoint area to correlate with a particular area surrounding the specific checkpoint position 130. As stated above, the checkpoint position 128 may be latitude and longitude coordinates. Similarly, the checkpoint area 130 may be a plurality of latitude and longitude coordinates that form a circular boundary around the checkpoint position 128. The radius of the circular boundary may be determined by the service provider as a distance that is small enough to ensure the accuracy and reliability of the system and yet large enough to allow verification to occur on a regular basis.

In another example, a user may use a mobile station 102 to establish his or her home address as a checkpoint area 130 and determine a checkpoint position 128 associated with that checkpoint area. In this example, the user may generate a checkpoint position 128 associated with a checkpoint area 130 using the mobile station 102 and a position estimation system. For example, the user may select a particular location as a checkpoint position 128, and use a GPS system (including GPS satellites 106) to determine the position of that particular location in the form of latitude and longitude coordinates. The user may then activate the mobile station 102 to store the position information of the user's home in the memory portion 126. The checkpoint area 130 may be determined by calculating a plurality of latitude and longitude coordinates that form a circular boundary around the checkpoint position 128, and this checkpoint area may also be stored in the memory portion 126.

There are several factors that should be considered in selecting a checkpoint position 128 and checkpoint area 130. For proper use of a celestial positioning system, a clear view of the sky to the horizon is preferred. For proper use of a terrestrial positioning system, a line of sight to multiple BTS's in the network is preferred. Other factors include (1) long term cumulative distribution function ("CDF") of the checkpoint position's terrestrial multi-path experienced over-time for reference sensitivity BTS equipment; (2) true time of flight measurements to the BTS's via a calibrated measurement receiver; (3) alternative terrestrial and GPS solution filter; (4) surveyed ground truth geo-position; and (5) ease of access to the checkpoint area.

The service manager 120 may determine whether the mobile station 102 is within the checkpoint area 130 in many different ways, such as a sensed activation and user activation. To trigger a sensed activation, the processor 122 and/or the position circuit 124 of the service manager 120 may receive a signal from the position estimation system that corresponds to the mobile station position, which indicates that the mobile station 102 is within the checkpoint area 130. In the alternative, the mobile station 102 may also utilize a local wireless connection, such as Bluetooth technology, for communicating with a wireless transceiver located at the checkpoint position 128. When the mobile station 102 recognizes that it has a local wireless connection with the wireless transceiver, the mobile station may determine whether it is within the checkpoint area 130. For a user activation, the mobile station 102 may sense that the user has selected a verification button of its user interface. The user would select the verification button at a known position so that the service manager 120 knows the checkpoint position 128. Since the memory portion 126 may include more than one checkpoint position 128, the user may have to select a particular checkpoint position among the plurality of checkpoint positions before the processor 122 can verify the mobile station position.

Figure 2:
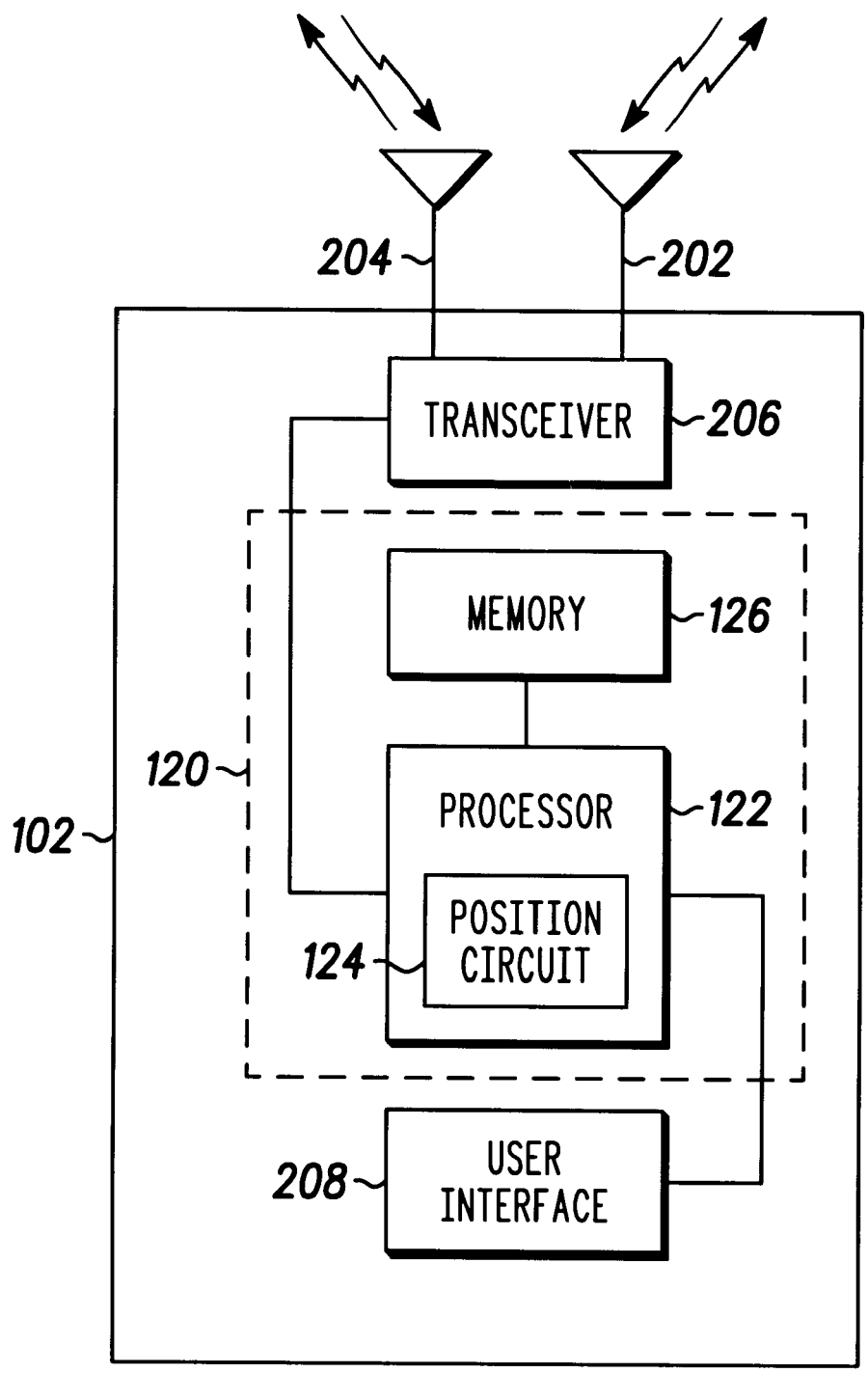
FIG. 2 is a block diagram representing inner components of a mobile station, such as the one shown in FIG. 1.

Referring to FIG. 2, there is provided a second preferred embodiment of the present invention. In contrast to the first preferred embodiment, the second preferred embodiment includes the service manager 120 within the mobile station 102 instead of the wireless infrastructure. The mobile station 102 generally includes at least one antenna 202, 204, a transceiver 206, and a user interface 208 as well as the service manager 120. Of course, as described above in reference to the first preferred embodiment, the service manager 120 includes a processor 122, a position circuit 124, and a memory portion 126. The individual components of the second preferred embodiment may be integrated together, in part or as a whole. For example, although the position circuit 124 is shown in FIG. 2 as being an integral part of the processor 122, the position circuit may be separate from the processor.

For the second preferred embodiment, a first antenna 202 and a second antenna 204 are coupled to the transceiver 206.

The first antenna 202 and the transceiver 206 communicate voice and/or data information to and from the BTS's via wireless communication. The first antenna 202, the transceiver 206, and the position circuit 124 also communicate position information associated with the mobile station 102 to and from the BTS's using a terrestrial positioning system, such as an FLT technique. The second antenna 204, the transceiver 206, and the position circuit 124 receive position information associated with the mobile station 102 from a celestial positioning system. For example, the second antenna 204 may receive GPS signals from one or more GPS satellites (shown in FIG. 1). The transceiver 206 may have different transceiver circuitry for the terrestrial positioning system and the celestial positioning system due to their differing requirements.

The memory portion 126 stores checkpoint positions and related parameters, including propagation and geographical parameters, and corresponding checkpoint areas. In the alternative, the checkpoint positions and/or checkpoint areas may be received from the wireless infrastructure via the antenna 202 and the transceiver 206, instead of being stored in the memory portion 126. The memory portion 126 also stores a program or a set of operating instructions for the processor 122. Also, the program or the set of operating instructions may be embodied in a computer-readable medium such as, but not limited to, paper, a programmable gate array, application specific integrated circuit, erasable programmable read only memory, read only memory, random access memory, magnetic media, and optical media. The processor 122 executes the program or the set of operating instructions such that the mobile station 102 operates in accordance with the preferred embodiments of the present invention.

The processor 122 compares the mobile station position and related parameters to a checkpoint position 128 and related parameters to generate a result based on this comparison. Then, the processor 122 indicates an error associated with the position of the mobile station 102 if the result exceeds a predetermined error tolerance. In particular, the processor 122 sends an indication signal to the wireless infrastructure of the wireless communication system 100 and/or the user interface 208 of the mobile station 102. The user interface 208 may provide a visual and/or audio indication to the user a light emitting diode (LED), text message, graphic indicator, audio tone, and the like. The wireless infrastructure may provide a similar visual and/or audio indication to the service provider.

Figure 3:
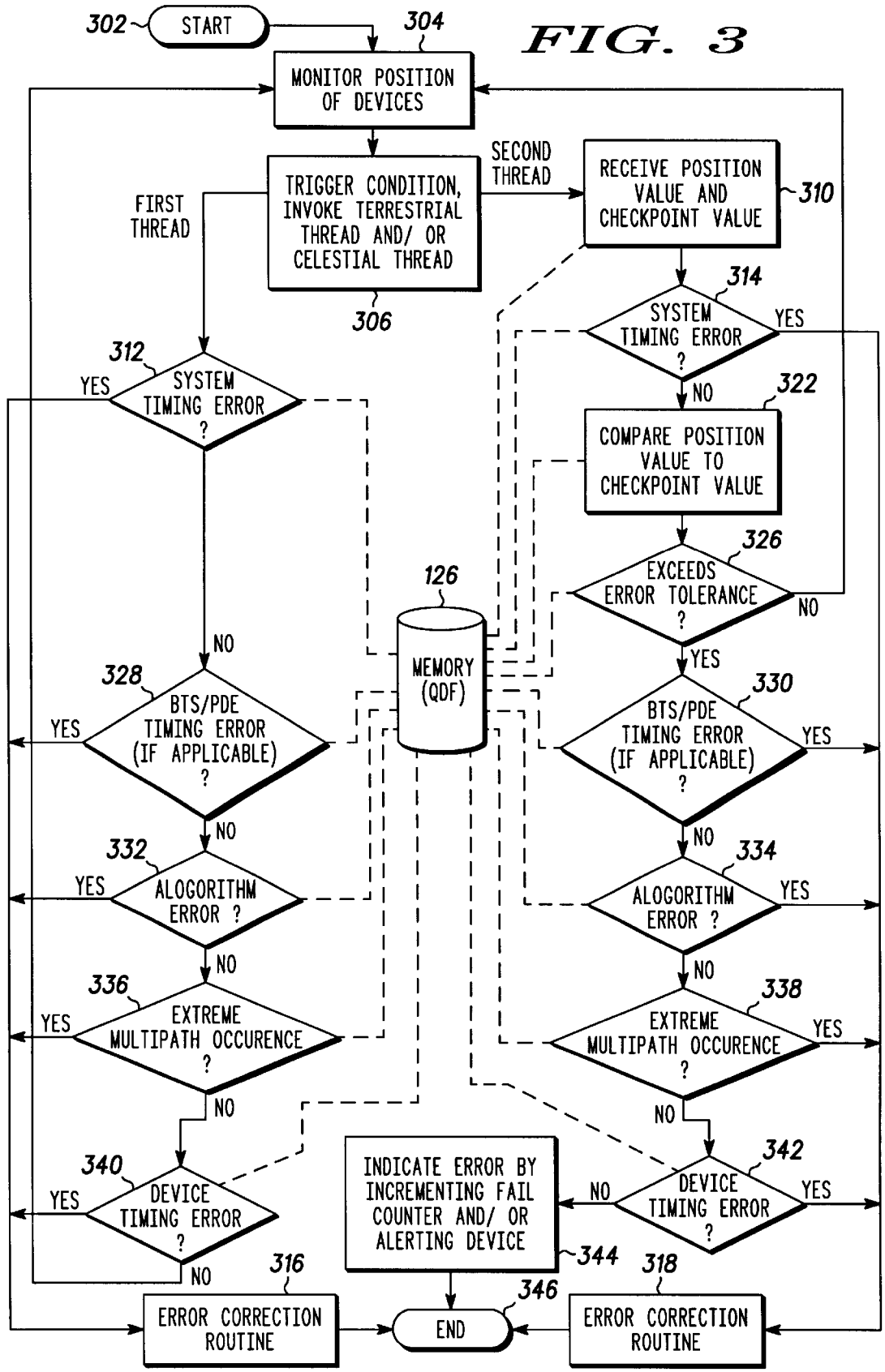
FIG. 3 is a flow diagram representing of first and second methods for verifying the position of a mobile station.
Figure 4:
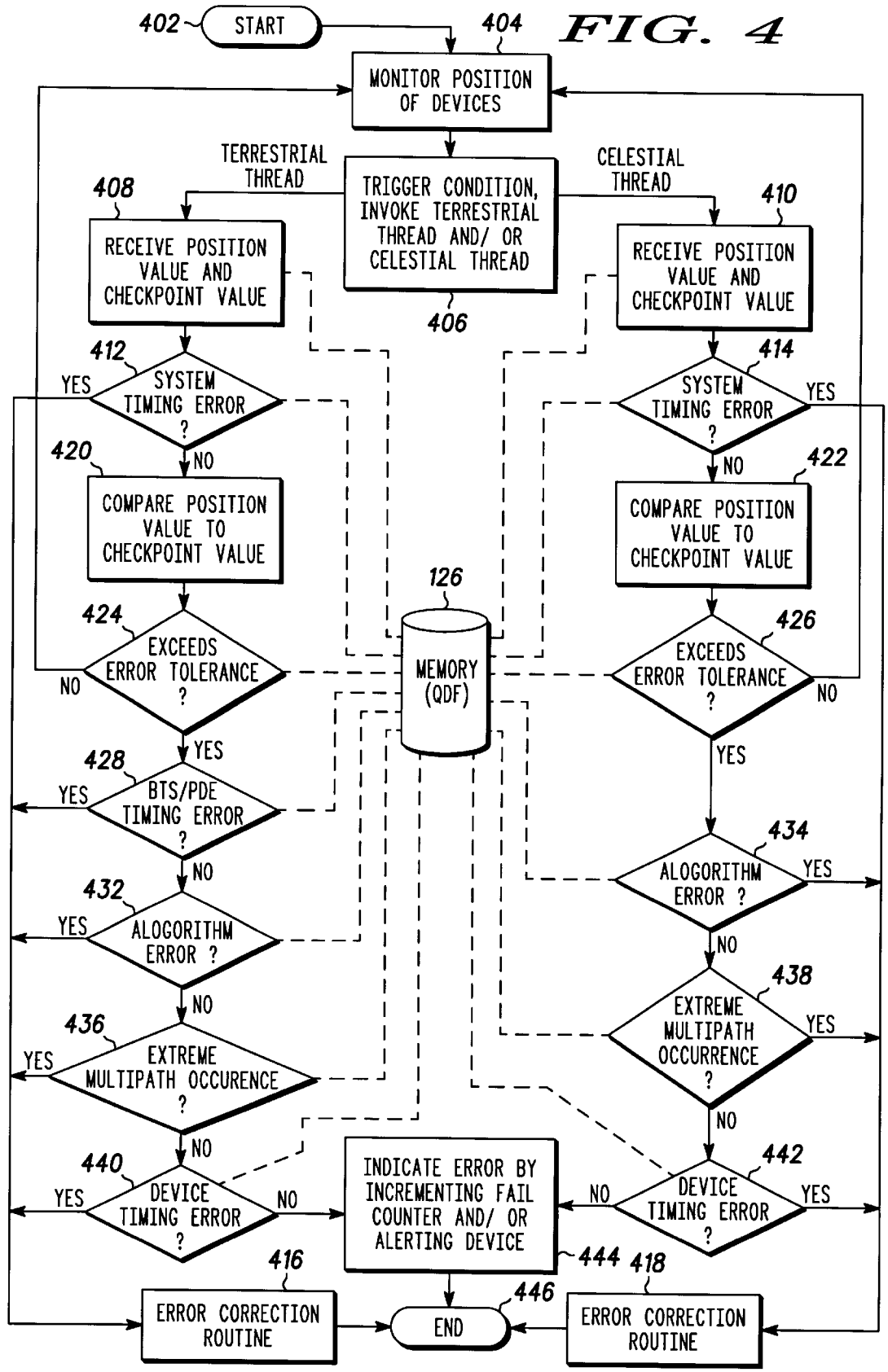
FIG. 4 is a flow diagram representing a third method for verifying the position of a mobile station.
Figure 5:
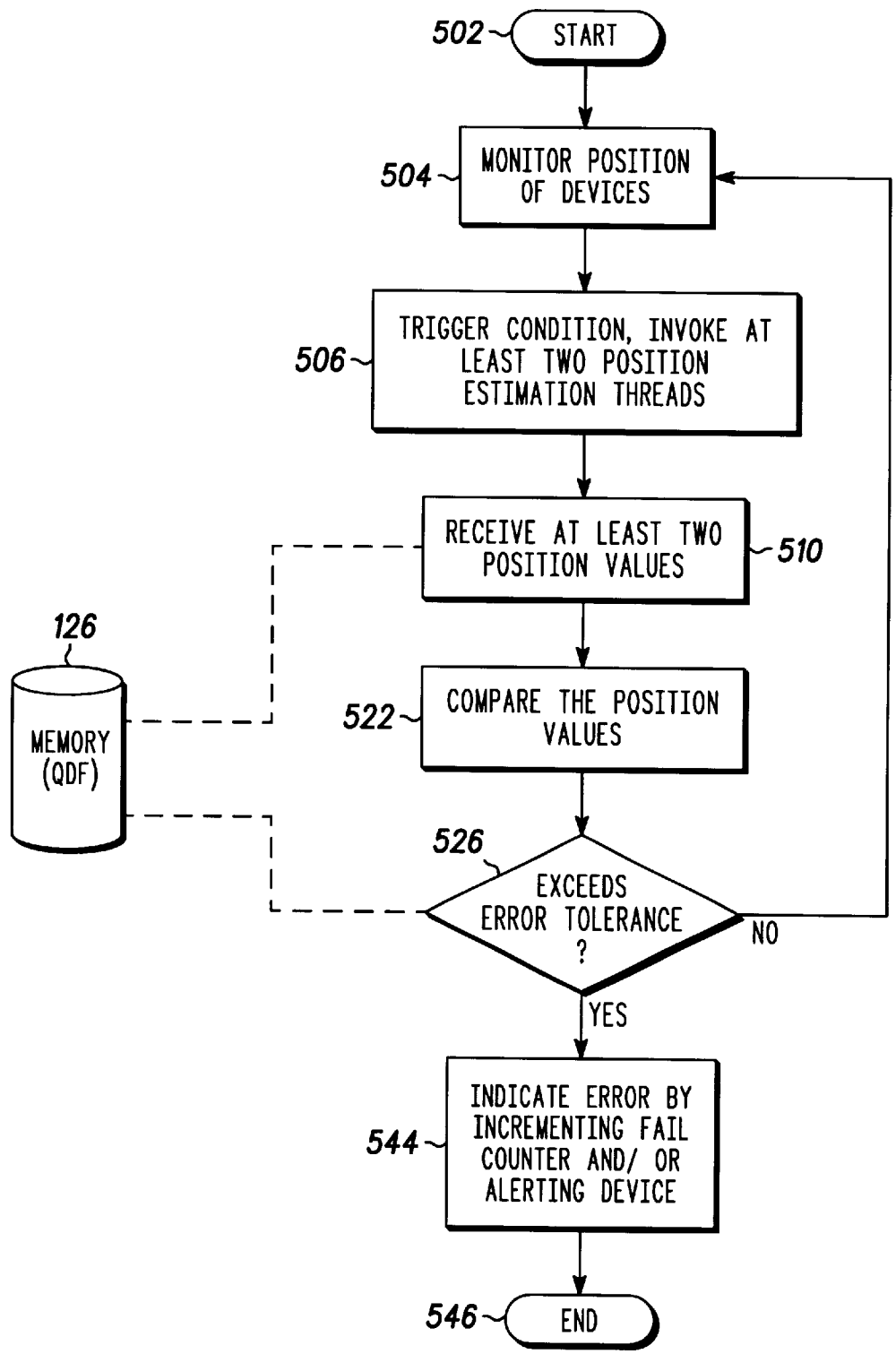
FIG. 5 is a flow diagram representing a fourth method for verifying the position of a mobile station.

Referring to FIGS. 3 through 5, a process 300 for verifying the position of a mobile station 102 reported to a wireless infrastructure in a wireless communication system 100 is shown in accordance with the preferred embodiments of the present invention. FIG. 3 represents a first method for checking a mobile station position at a checkpoint area 130 using one position estimation system, and a second method for verifying mobile station positions at a checkpoint area using two position estimation systems. FIG. 4 represents a third method for verifying mobile station positions at a checkpoint area 130 using three position estimation systems. FIG. 5 represents a fourth method for verifying mobile station positions without positioning the mobile station at a checkpoint area 130. The wireless communication system 100 may use a wide variety of position estimation systems to determine the mobile station position including a terrestrial positioning system, a celestial positioning system, and a third party system. For a third party system, the mobile station position is determined by another entity and delivered to the mobile station 102. As stated above, third party systems include, but are not limited to, overlay terrestrial location systems, such as those systems available from TruePosition of King of Prussia, Pa. and U.S. Wireless of San Ramon, Calif.

Referring in particular to FIG. 3, the first method of the present invention may be used for a mobile station 102 and corresponding wireless infrastructure having access to one position estimation system. The process begins at step 302 and, then, the system 100 monitors the positions reported by one or more mobile stations 102 by receiving position information of each mobile station at step 304. The position estimation system provides the necessary information to determine the position of each mobile station 102. Preferably, as the system 100 verifies a reported position of one mobile station 102, the system will continue to monitor and verify the positions of its other mobile stations so that all mobile stations can be processed concurrently.

When a mobile station 102 approaches a checkpoint area 130, the delta value between the mobile station position and the checkpoint position 128 decreases. When the delta value decreases below a predetermined level, the service manager 120 moves into a "snapshot" position state, as represented by step 306. In this state, the service manager 120 collects the mobile station's current position using the position estimation system, such as a celestial positioning system, a terrestrial positioning system or a third party system. Upon determining that a particular mobile station 102 is within a particular checkpoint area 130, the system 100 would start the first thread at step 306. For this first method, the second thread is not used.

In reference to all four methods shown in FIGS. 3 through 5, the trigger condition in step 306 may also occur in other instances. For example, the mobile station 102 may always reports the same position. In such situations, the service manager 120 determines that the position estimation systems are not reporting accurate mobile station positions and, thus, invokes the appropriate thread(s).

Referring again to FIG. 3, the service manager 120 checks for any system timing error to ensure that the mobile vector data is reasonably current in step 312. If there is any problem with the system timing, then the service manager 120 does not continue with the remainder of the verification process. For the preferred embodiments, the service manager 120 executes an error correction routine in step 316 in an attempt to fix the system timing error.

If the service manager 120 determines that the mobile vector data is reasonably current, then the service provider 120 checks to see if one of four other possible errors classes may have occurred: (1) a BTS timing error, (2) a position calculation function ("PCF") algorithm error, (3) an extreme multi-path occurrence(s), or (4) a device timing error.

To investigate the possibility of BTS/PDE timing error, the service manager 120 checks to see if the BSC 108 is reporting a timing error from one of the BTS's 104 or if the PDE 124 is reporting a timing error in step 328. If the test is negative, then the service manager 120 checks the next error condition. If the test is positive, then the service manager 120 does not continue with the remainder of the verification process. For the preferred embodiments, the service manager 120 executes an error correction routine in step 316 in an attempt to fix the BTS/PDE timing error.

The service manager 120 also checks for a PCF algorithm error based on the known time of flight measurements stored in the memory portion 126 in step 332. The perfect time of flight data, benchmark position, and acceptable tolerance may be processed by the wireless infrastructure or sent over the air to verify operation of the position calculation function in the mobile station 102. The position calculated by the position calculation function is compared to a benchmark position stored in the memory portion 126. If the difference is within a particular tolerance, the PCF algorithm passes the test and the routine moves on to the next test. If the test for the PCF algorithm fails, a flag is set indicating a possible error condition of the position calculation function. For the preferred embodiments, the service manager 120 executes an error correction routine in step 316 in an attempt to fix the PCF algorithm error.

To check for extreme multipath occurrences, the service manager 120 checks a reported BTS/PDE timing vector value against a multipath error of the same BTS timing vector in step 336. The multipath error can be over a user-specified time to snapshot experienced performance. An acceptable BTS timing drift may be included allowing for less than perfect BTS reference clocks. If the reported error falls inside a particular statistical set point, the multipath check passes. For the preferred embodiments, the service manager 120 executes an error correction routine in step 316 in an attempt to fix the PCF algorithm error.

If all three tests pass in steps 328, 332 and 336, then the mobile station 102 may be experiencing a device timing error in step 340. The system provider can setup a quality of service process to send a message to the mobile station 102. For example, the message may indicate that the mobile station 102 may need location calibration service after it fails a predetermined amount of checkpoint position verifications.

If errors are not found in the wireless infrastructure or the mobile stations 102 by any of the above error checking routines, then the service manager 120 may terminate the verification process or continue to monitor the positions of mobile devices (step 304) as shown in FIG. 3.

Still referring to FIG. 3, the second method of the present invention may be used for a mobile station 102 and corresponding wireless infrastructure having access to two position estimation systems. The process begins at step 302 and, then, the system 100 monitors the positions reported by one or more mobile stations 102 by receiving position information of each mobile station at step 304. Similar to the first method described above, the service manager 120 collects the mobile station's current position using one of the two position estimation systems, as represented by step 306, when the delta value between the mobile station position and the checkpoint position decreases below a predetermined level. Upon determining that a particular mobile station 102 is within a particular checkpoint area 130, the system 100 would start the first and second threads at step 306. The first thread is described above in reference to the first method, so the remainder of this discussion for the second method shall be directed to the second thread.

As stated above, one position estimation system has been used to determine that the mobile station 102 is located within a checkpoint area 130. When verifying the other position estimation system, the service manager 120 accepts the current mobile vector data in step 310. The current mobile vector data includes a mobile station position and a checkpoint position 128. For the preferred embodiments, the checkpoint position 128 is a benchmark ground truth position stored in the memory portion 126, such as a QDF database. Similar to step 312 the first thread, the service manager 120 checks for any system timing error in step 314 to ensure that the mobile vector data is reasonably current and executes an error correction routine in step 318, if necessary.

If the service manager 120 determines that the mobile vector data is reasonably current, then it compares the mobile station position and related parameters to the checkpoint position 128 and related parameters stored in the memory portion 126 for that particular checkpoint area 130 in step 322. The service manager 120 generates a result based on this comparison. Referring to step 326, if the result falls within a predetermined error tolerance, the position estimation systems are working properly within specification and the service manager 120 goes back to monitoring the position of various devices in step 304. Preferably, the specification is defined or measured by the user and/or service provider.

If the result falls outside of the predetermined error tolerance, then the service provider 120 checks to see if one of four possible errors classes may have occurred: (1) a BTS timing error, (2) a position calculation function ("PCF") algorithm error, (3) an extreme multi-path occurrence(s), or (4) a device timing error. Steps 330, 334, 338 and 342 function the same as steps 328, 332, 336 and 340, respectively, as described above in reference to the first method.

If errors are not found in the wireless infrastructure or the mobile stations 102 by any of the above error checking routines in steps 330, 334, 338 and 342, then the service manager 120 indicates an error by providing an error signal to the wireless infrastructure and/or the mobile station in step 344. For the preferred embodiment, a fail counter in the mobile stations 120 is incremented and an alarm signal is visually indicated by the mobile station. Thereafter, the verification process terminates in step 346.

Referring to FIG. 4, the third method of the present invention may be used for a mobile station 102 and corresponding wireless infrastructure having access to three position estimation systems. Similar to the first and second methods, the process begins at step 402, the system 100 monitors the positions reported by one or more mobile stations 102 at step 404, and the service manager 120 collects the mobile station's current position using one of the three position estimation systems, as represented by step 406. Upon determining that a particular mobile station 102 is within a particular checkpoint area 130, the system 100 would start the first and second threads at step 406. For the third method shown in FIG. 4, the first thread is a terrestrial thread, and the second thread is a celestial thread. However, it is to be understood that the first and second threads utilize any combination of position estimation systems including a terrestrial positioning system, a celestial positioning system, and a third party system.

As stated above, one position estimation system has been used to determine that the mobile station 102 is located within a checkpoint area 130. When verifying the other two position estimation systems, the service manager 120 accepts the current mobile vector data in steps 408 and 410. The current mobile vector data includes a mobile station position and a checkpoint position 128. The service manager 120 then checks for any system timing error in steps 412 and 414 to ensure that the mobile vector data is reasonably current and executes an error correction routine in steps 416 and 418, if necessary.

If the service manager 120 determines that the mobile vector data is reasonably current, then it compares the mobile station position and related parameters to the checkpoint position 128 and related parameters stored in the memory portion 126 for that particular checkpoint area 130 in steps 420 and 422. The service manager 120 generates a result based on this comparison. Referring to steps 424 and 426, if the result falls within a predetermined error tolerance, the position estimation systems are working properly within specification and the service manager 120 goes back to monitoring the position of various devices in step 404. Preferably, the specification is defined or measured by the user and/or service provider.

If the result falls outside of the predetermined error tolerance, then the service provider 120 checks to see if one of four possible errors classes may have occurred: (1) a BTS timing error, (2) a position calculation function ("PCF") algorithm error, (3) an extreme multi-path occurrence(s), or (4) a device timing error. Steps 428 through 442 of the third method function the same as similarly named steps, namely steps 328 through 342, of the first and second methods described above.

If errors are not found in the wireless infrastructure or the mobile stations 102 by any of the above error checking routines in steps 428 through 442, then the service manager 120 indicates an error by providing an error signal to the wireless infrastructure and/or the mobile station in step 444. For the preferred embodiment, a fail counter in the mobile stations 120 is incremented and an alarm signal is visually indicated by the mobile station. Thereafter, the verification process terminates in step 446.

Referring to FIG. 5, the fourth method of the present invention may be used for a mobile station 102 and corresponding wireless infrastructure to verify mobile station positions without positioning the mobile station at a checkpoint area 130. Similar to the other methods described above, the process of the fourth method begins at step 502, the system 100 monitors the positions reported by one or more mobile stations 102 at step 504, and the service manager 120 collects the mobile station's current position using one of the position estimation systems, as represented by step 506.

Upon detecting an activation by a mobile station 102, the service manager 120 accepts the current mobile vector data in step 510. The current mobile vector data includes a first mobile station position and a second mobile station position. The service manager 120 then compares the first mobile station position and related parameters to the second mobile station position and related parameters stored in step 522. The service manager 120 generates a result based on this comparison. Referring to step 526, if the result falls within a predetermined error tolerance, the position estimation systems are working properly within specification and the service manager 120 goes back to monitoring the position of various devices in step 504. Preferably, the specification is defined or measured by the user and/or service provider.

Finally, the service manager 120 indicates an error by providing an error signal to the wireless infrastructure and/or the mobile station in step 544. For the preferred embodiment, a fail counter in the mobile stations 120 is incremented and an alarm signal is visually indicated by the mobile station. Thereafter, the verification process terminates in step 546.

The present invention may be used for a wide variety of applications. For example, the wireless communication system may receive a signal at a checkpoint area for validation or verification of the mobile station's position for a particular purpose. The system may receive a request for certification of a mobile station's location because a validation or proof of location is required for a particular transaction. For example, when the mobile device is located within a retail store of a given merchant, the request may be transmitted from a merchant's device, via a wireless link, when the mobile device enters a checkpoint area. The mobile station must verify it location to merchant's device in order to satisfy the merchant and complete the financial transaction.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What we claim is:

1. A method for verifying a position of a mobile station in a wireless communication system, the method comprising the steps of:

determining whether the mobile station is located within a checkpoint area;

comparing a mobile station position of the mobile station within the checkpoint area and a checkpoint position corresponding to the checkpoint area to generate a result;

determining whether the result exceeds a predetermined error tolerance; and indicating an error associated with the position of the mobile station if the result exceeds the predetermined error tolerance.

2. The method of claim 1, further comprising the step of triggering an activation when the mobile station is located within the checkpoint area.

3. The method of claim 1, wherein the mobile station position is determined by the mobile station.

4. The method of claim 1, wherein the mobile station position is determined by one of a celestial positioning system and a terrestrial positioning system.

5. The method of claim 1, wherein the checkpoint area and the checkpoint position are predetermined by a wireless infrastructure of the wireless communication system.

6. The method of claim 1, wherein the checkpoint area and the checkpoint position area are determined by the mobile station.

7. The method of claim 1, further comprising the steps of:

detecting whether at least one of a system timing error, a BTS timing error, an algorithm error, an extreme multipath occurrence, and a device timing error has occurred; and executing an error correction routine if at least one of the system timing error, the BTS timing error, the algorithm error, the extreme multipath occurrence, and the device timing error has been detected.

8. A method for verifying a position of a mobile station in a wireless communication system, the method comprising the steps of:

determining whether the mobile station is located within a checkpoint area;

comparing a first mobile station position of the mobile station within the checkpoint area and a checkpoint position corresponding to the checkpoint area to generate a first result, and comparing a second mobile station position of the mobile station within the checkpoint area and the checkpoint position corresponding to the checkpoint area to generate a second result;

determining whether at least one of the first result and the second result exceeds a predetermined error tolerance; and indicating an error associated with the position of the mobile station if at least one of the first result and the second result exceeds the predetermined error tolerance.

9. The method of claim 8, further comprising the step of triggering an activation when the mobile station is located within the checkpoint area.

10. The method of claim 8, wherein the first and second mobile station positions are determined by the mobile station.

11. The method of claim 8, wherein the first mobile station position is determined by a terrestrial positioning system and the second mobile station position is determined by a celestial positioning system.

12. The method of claim 8, wherein:
the first mobile station position is determined by the mobile station and the second mobile station position is determined by a wireless infrastructure of the wireless communication system; and
the mobile station receives the second mobile station position from the wireless infrastructure.

13. The method of claim 8, wherein the checkpoint area and the checkpoint position are predetermined by a wireless infrastructure of the wireless communication system.

14. The method of claim 8, wherein the checkpoint area and the checkpoint position area are determined by the mobile station.

15. The method of claim 8, further comprising the steps of:
detecting whether at least one of a system timing error, a BTS timing error, an algorithm error, an extreme multipath occurrence, and a device timing error has occurred; and
executing an error correction routine if at least one of the system timing error, the BTS timing error, the algorithm error, the extreme multipath occurrence, and the device timing error has been detected.

16. A wireless communication system for verifying a position of a mobile station comprising:

a memory portion adapted to store a checkpoint position corresponding to a checkpoint area;
a position circuit adapted to generate a mobile station position of the mobile station in response to a detection that the mobile station is within the checkpoint area; and
a processor coupled to the memory portion and the position circuit, the processor being operable to compare the mobile station position and the checkpoint position to generate a result, and indicate an error associated with the position of the mobile station if the result exceeds a predetermined error tolerance.

17. The system of claim 16, wherein the processor determines whether the mobile station has been detected to be within the checkpoint area.

18. The wireless communication system of claim 16, wherein the mobile station position is determined by the mobile station.

19. The wireless communication system of claim 16, wherein the mobile station position is determined by one of a celestial positioning system and a terrestrial positioning system.

20. The wireless communication system of claim 16, wherein the checkpoint area and the checkpoint position are predetermined by a wireless infrastructure of the wireless communication system.

21. The wireless communication system of claim 16, wherein the checkpoint area and the checkpoint position area are determined by the mobile station.

22. The wireless communication system of claim 16, wherein the processor executes an error correction routine if at least one of a system timing error, a BTS timing error, an algorithm error, an extreme multipath occurrence, and a device timing error is detected.

* * * * *